(12) United States Patent
Chen et al.

(10) Patent No.: US 8,564,243 B2
(45) Date of Patent: Oct. 22, 2013

(54) CHARGING MODULE

(75) Inventors: Shih-Hui Chen, Taoyuan Hsieh (TW); Chin-Tien Lin, Taoyuan Hsieh (TW)

(73) Assignee: Tennrich International Corp., Luchu Hsiang (TW)

( * ) Notice: Subject to any disclaimer, the term of this patent is extended or adjusted under 35 U.S.C. 154(b) by 491 days.

(21) Appl. No.: 13/037,568

(22) Filed: Mar. 1, 2011

(65) Prior Publication Data

US 2012/0223673 A1    Sep. 6, 2012

(51) Int. Cl.
*H02J 7/00*    (2006.01)
*H02J 7/02*    (2006.01)

(52) U.S. Cl.
USPC ........... 320/108; 320/111; 320/112; 320/113; 320/114; 320/115

(58) Field of Classification Search
CPC ....................................................... H02J 7/025
USPC ....................................................... 320/108
See application file for complete search history.

(56) References Cited

U.S. PATENT DOCUMENTS 7,548,040 B2 *  6/2009  Lee et al. ....................... 320/108
7,683,572 B2 *  3/2010  Toya ............................ 320/108

* cited by examiner

*Primary Examiner* — Edward Tso
*Assistant Examiner* — Ahmed Omar
(74) *Attorney, Agent, or Firm* — Jackson IPG PLLC

(57) ABSTRACT

A charging module comprises a power supply device and at least one adapter, wherein a first and second magnetic attraction components, which are attracted to each other, are respectively disposed to a coupling place between the adapter and the power supply device. While in use, the power supply device is electrically connected to an electronic product through the adapter. Power from the power supply device is delivered to the electronic product, and attraction of the first and second magnetic attraction components is utilized to retain the junction effect between the adapter and the power supply device. The electronic product can be separated from the power supply device by slightly imposing forces. The electronic product can be quickly taken by a user without influencing the operation of the electronic product.

17 Claims, 14 Drawing Sheets

CHARGING MODULE

BACKGROUND OF THE INVENTION

1. Field of the Invention

The present invention relates to a charging module, and more particularly to the charging module capable of retaining the junction effect between a power supply device and an electronic product and rapidly using the electronic product.

2. Description of the Related Art

Since the technology is continuously developed, people may require electronic products to have more functions, especially for consumer electronics. A conventional electronic product having a larger size (e.g. a compact disc player, a telephone or a desktop computer) is simplified to form a portable electronic product with high efficiency (e.g. a multimedia player (MPEG Audio Layer-3, MP3), a mobile phone or a laptop computer) to increase the efficiency for people in daily life.

The power required for the foregoing portable electronic products is mostly adapted with a rechargeable battery such as a nickel-metal hydride battery or a lithium cell. The rechargeable battery is mainly charged by a charging device. The charging device comprises a charging seat and a power source plug. The charging seat and the power source plug are connected by wires, and the charging seat is disposed with a power conversion module and a charging slot so that the rechargeable battery can be placed in the charging slot to supply power for the electronic products during the power charging mode.

Some charging devices integrate the power conversion module into a side of the power source plug and are electrically connected to the electronic products through a wire equipped with an electric connector to supply power for the electronic products during the power charging mode. Moreover, when some portable electronic products are used, a charging device as a movable power is carried to charge the electronic product.

However, when the portable electronic products are charged by a power supply system with grid-connection or the movable power source, the portable electronic products are electrically connected to the charging device through wires or the electric connector. When a user is in immediate need of the electronic products (e.g. to answer an important call when the mobile phone is charging), the electronic products are connected with wires which cause inconvenience.

SUMMARY OF THE INVENTION

In view of the shortcomings of the prior art, the inventor(s) of the present invention based on years of experience in the related industry to conduct extensive researches and experiments, and finally developed a charging module as a principle objective so that a junction effect between a power supply device and an electronic product can be retained, and the electronic product can be quickly taken and used.

To achieve the foregoing objective, the charging module of the invention comprises a power supply device and at least one adapter, wherein the adapter is equipped with a first coupling portion and a second coupling portion at two ends of a main body of the adapter to respectively and electrically connect the power supply device and the electronic product. A first magnetic attraction component and a second magnetic attraction component, which are attracted to each other, are respectively disposed to a coupling place between the adapter and the power supply device.

When the charging module of the invention is used, the power supply device is electrically connected to the electronic product through the adapter. Power from the power supply device is delivered to the electronic product. Moreover, a desired junction effect between the adapter and the power supply device can be retained through the attraction of the first and second magnetic attraction components. The electronic product can be separated from the power supply device by slightly imposing forces. The electronic product can be quickly taken by a user without influencing the operation of the electronic product.

When the invention is implemented, the charging module can dispose a power conversion module inside the power supply device. The power conversion module converts alternating current power into direct current power required for operating and charging the electronic product.

When the invention is implemented, the charging module can dispose at least one rechargeable battery inside the power supply device. The rechargeable battery supplies direct current power required for charging or operating the electronic product.

When the invention is implemented, the charging module can dispose a power conversion module and at least one rechargeable battery. The power conversion module converts alternating current power into direct current power as a supplement power for the rechargeable battery, and the rechargeable battery then supplies power required for charging or operating the electronic product.

In the foregoing embodiments, the first magnetic attraction component and the second magnetic attraction component can be respectively composed of a magnet and an iron member.

In the foregoing embodiments, the first magnetic attraction component and the second magnetic attraction component can be composed of magnets.

In the foregoing embodiments, the charging module can dispose a voltage step-down circuit inside the adapter or the power supply device and dispose a switch for switching output voltages of the voltage step-down circuit to the adapter or the power supply device. The power required for charging or operating the electronic product can be manually switched according to a demand of the electronic product.

In the foregoing embodiments, the charging module can integrate a voltage step-down circuit and a detection circuit, which is electrically connected to the first coupling portion and the voltage step-down circuit, inside the adapter or the power supply device. The detection circuit detects a status of the electronic product to automatically regulate output voltages of the voltage step-down circuit, thereby supplying power required for charging or operating the electronic product.

DETAILED DESCRIPTION OF THE PREFERRED EMBODIMENTS

The foregoing and other technical characteristics of the present invention will become apparent with the detailed description of the preferred embodiments and the illustration of the related drawings.

Figure 1:
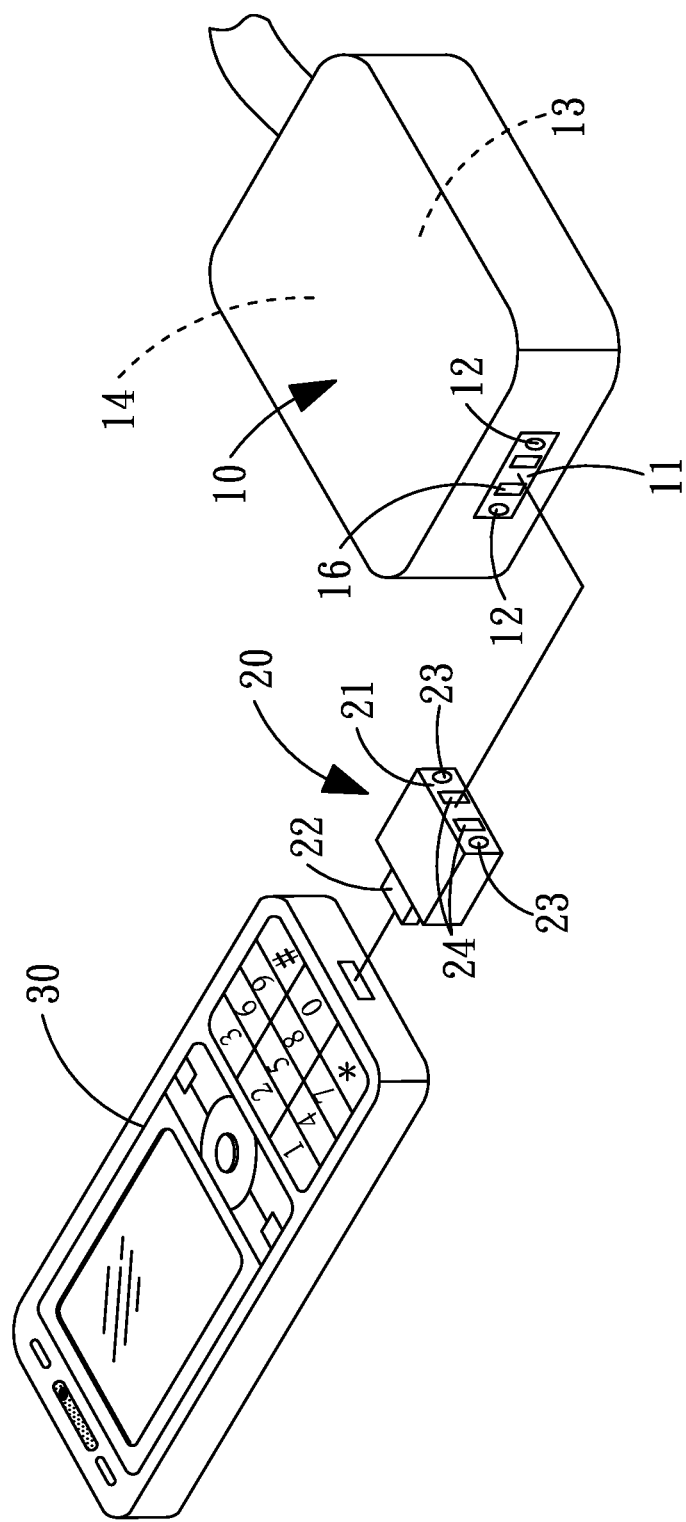
FIG. 1 is a three-dimensional drawing of an appearance of a charging module according to a first embodiment of the present invention.
Figure 2:
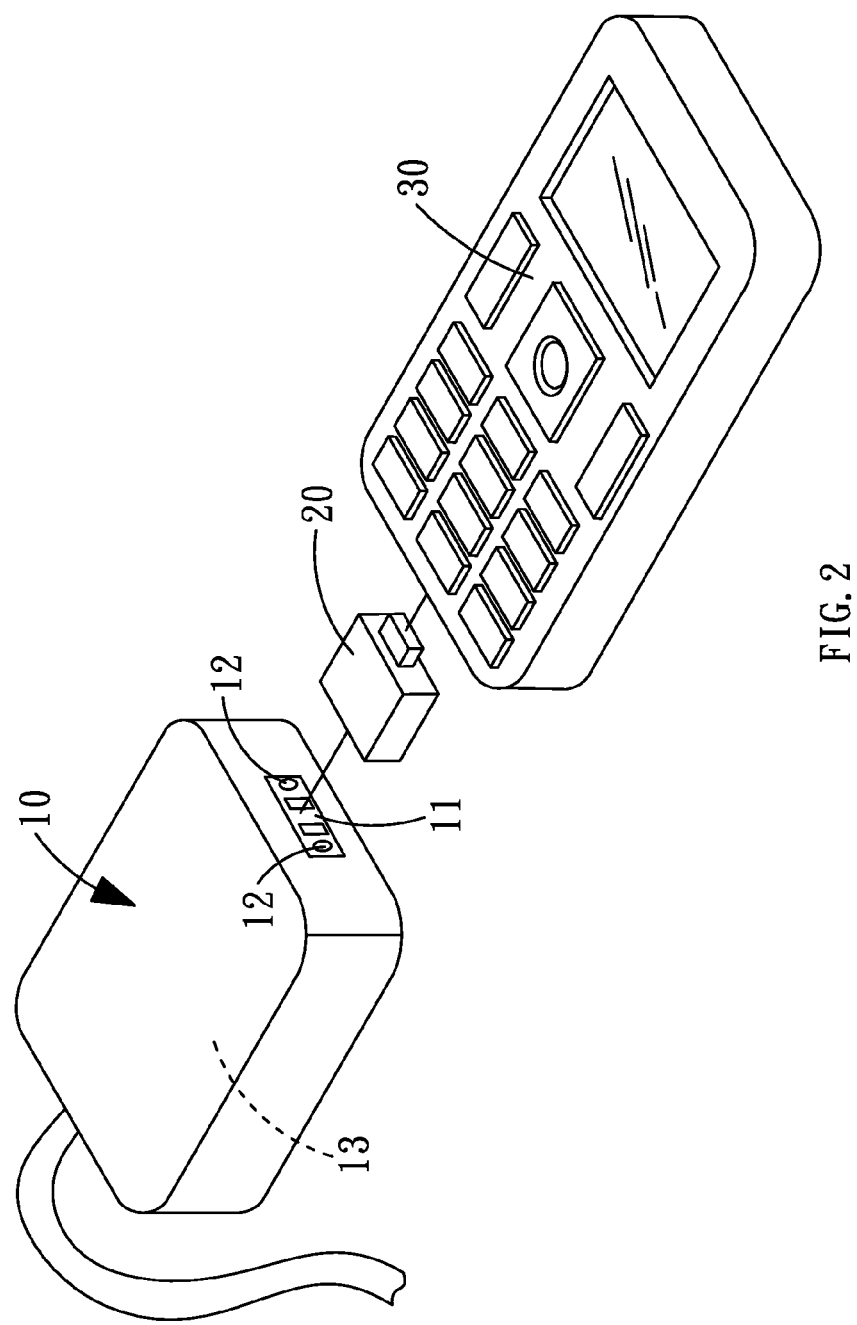
FIG. 2 is a three-dimensional drawing of an appearance of a charging module at another visual angle according to a first embodiment of the present invention.

With reference to FIG. 1 for a three-dimensional drawing of a charging module in accordance with a first embodiment of the invention and with reference to FIG. 2 for a three-dimensional drawing of a charging module at another visual angle in accordance with a first embodiment of the invention are depicted. The charging module of the invention comprises a power supply device 10 and at least one adapter 20.

The power supply device 10 is used for supplying power required for charging or operating an electronic product 30. A first coupling portion 11 is disposed on a main body to electrically connect the adapter 20, and a first magnetic attraction component 12 is disposed to the first coupling portion. The adapter 20 has a second coupling portion 21, which is electrically connected to the power supply device 10, and a third coupling portion 22, which is electrically to the electronic product 30, on the main body. The third coupling portion 22 has electrode contacts (not shown in the figure) matching a predetermined format of the electronic product 30. The adapter 20 has a second magnetic attraction component 23 attracted to the first magnetic attraction component 12 at the second coupling portion 21 coupled to the power supply device 10.

When the charging module of the invention is in use, the first coupling portion 11 and the second coupling portion 21 are utilized to form electrical connection between the power supply device 10 and the adapter 20, and the third coupling portion 22 on the main body of the adapter 20 is utilized to electrically connect the electronic product 30 to achieve a goal of delivering power from the power supply device 10 to the electronic product 30. Of course, the charging module of the invention can be equipped with other adapters having different third coupling portion specifications to match different electronic products.

The first magnetic attraction component 12 and the second magnetic attraction component 23 can be respectively composed of a magnet and an iron member or can be totally composed of magnets. A desired junction effect between the adapter 20 and the power supply device 10 can be retained by mainly utilizing the attraction of the first magnetic attraction component 12 and the second magnetic attraction component 23. Therefore, when the electronic product 30 is urgently needed by a user, the electronic product 30 can be separated from the power supply device 10 by slightly imposing force. The electronic product 30 can be quickly used without influencing the operation of the electronic product 30 due to the power supply device.

In the embodiments of FIG. 1 and FIG. 2, the charging module of the invention is to dispose a power conversion module 13 inside the power supply device 10. The power conversion module 13 converts alternating current power into direct current power required for charging or operating the electronic product 30. The charging module of the invention can be shown in FIG. 3, at least one rechargeable battery 14 is disposed inside the power supply device 10. The rechargeable battery 14 supplies direct current power required for charging or operating the electronic product, thereby forming a movable power that is conveniently carried-on.

Figure 4:
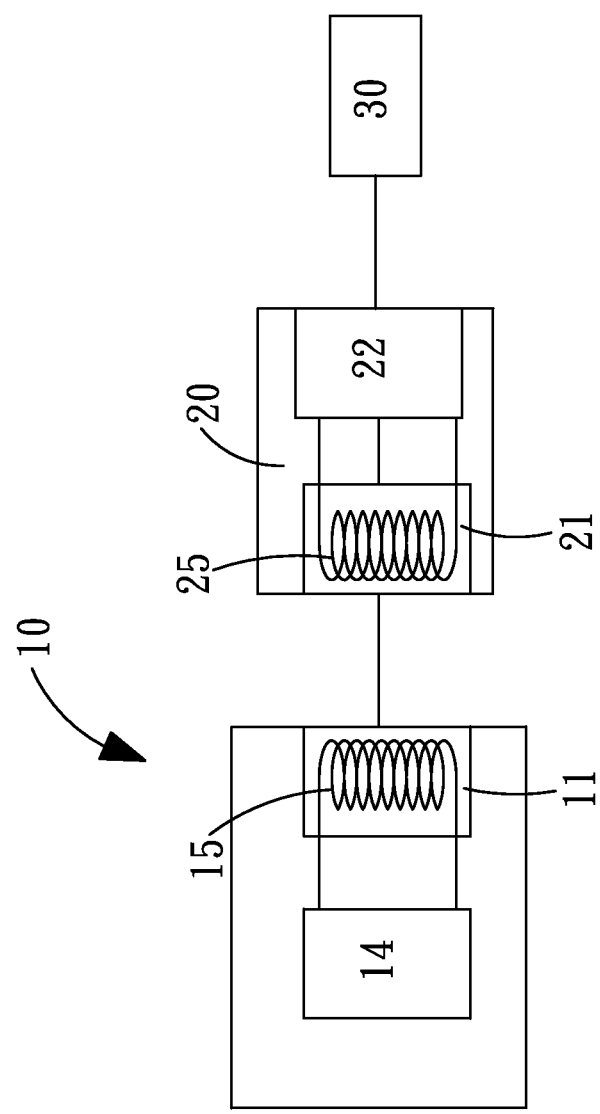
FIG. 4 is a structural diagram of a power supply device according to a second embodiment of the present invention.

The charging module of the invention can also be shown in FIG. 4, a power conversion module 13 and at least one rechargeable battery 14 are disposed inside the power supply device 10. The power conversion module 13 converts alternating current power into direct current power as a supplement power for the rechargeable battery 14, and the rechargeable battery 14 then supplies power required for charging or operating the electronic product.

Figure 3:
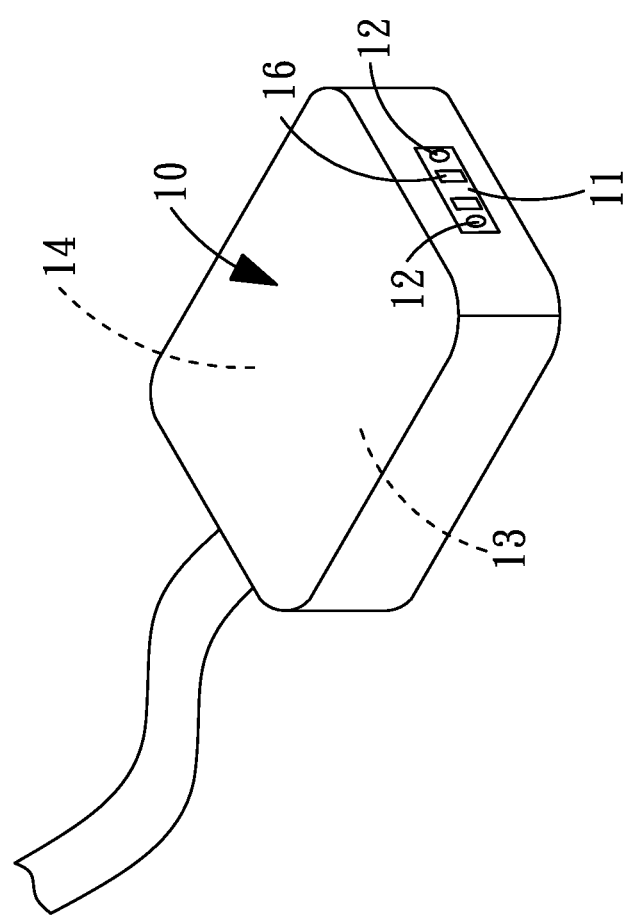
FIG. 3 is a structural diagram of a power supply device according to a second embodiment of the present invention.

Moreover, the charging module of the invention can be shown in FIG. 1 and FIG. 3, the first coupling portion 11 of the power supply device 10 has electrode contacts 16 with predetermined numbers/formats. The second coupling portion 21 of the adapter 20 has electrode contacts 24 with predetermined numbers/formats. Electrical connection is formed by contacting the electrode contacts 16, 24 to achieve a goal of delivering power to the electronic product 30 from the power supply device 10.

Further, the charging module of the invention can be shown in FIG. 4, at least one rechargeable battery 14 is disposed inside the power supply device 10. A first induction coil 15 connected to the rechargeable battery 14 is disposed to the first coupling portion 11. A second induction coil 25 is disposed to the second coupling portion 21 of the adapter 20. The second induction coil 25 is connected to the third coupling portion 22. Since the first induction coil 15 and the second induction coil 25 induce electromagnetic waves, the rechargeable battery 14 supplies power required for charging or operating the electronic product 30 to achieve a goal of charging the electronic product 30 in a non-contact manner.

Figure 5:
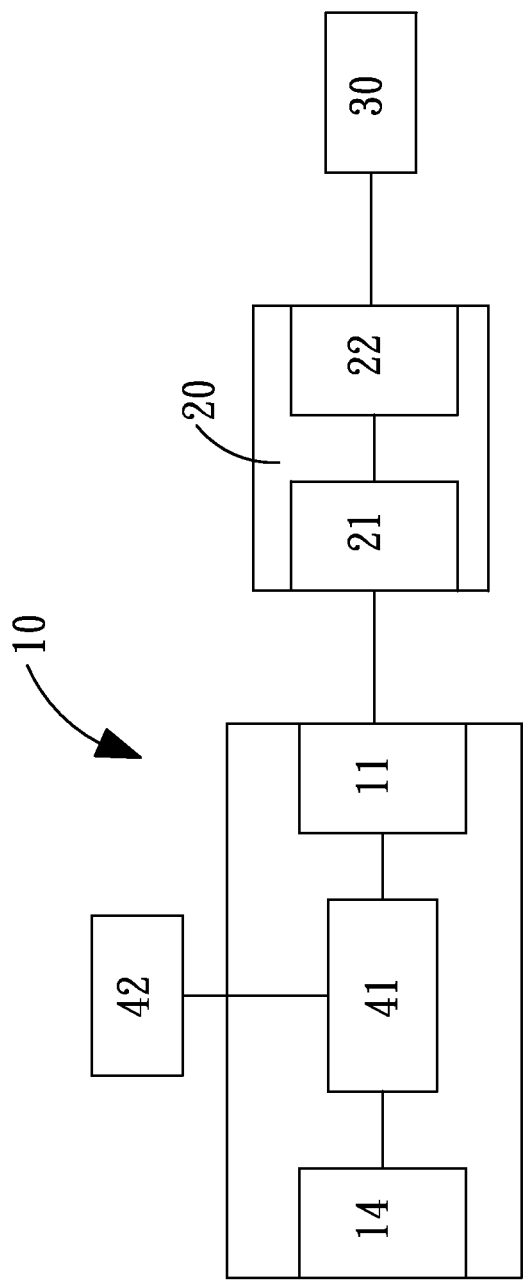
FIG. 5 is a block diagram of an assembled architecture of a charging module according to a third embodiment of the present invention.

Specifically, in the foregoing embodiments, the charging module of the invention can integrate a voltage step-down circuit 41 inside the power supply device 10 with a switch 42, which is provided for switching output voltages of the voltage step-down circuit 41, on the power supply device 10. As shown in FIG. 5, the power of charging or operating the electronic product 30 can be manually switched according to the demand of the electronic product 30. The voltage step-down circuit can also be disposed inside the adapter.

Figure 6:
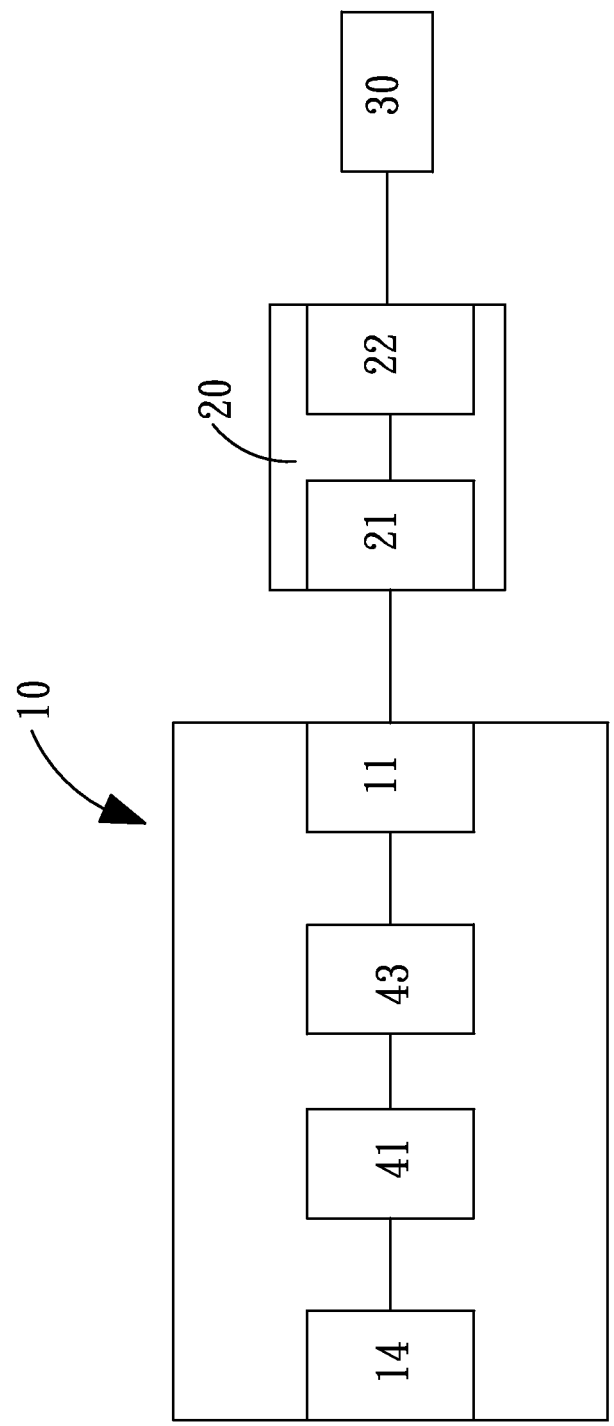
FIG. 6 is a block diagram of an assembled architecture of a charging module according to a fourth embodiment of the present invention.

In the foregoing embodiments, the charging module of the invention can be shown in FIG. 6, a voltage step-down circuit 41 and a detection circuit 43, which is electrically connected to the first coupling portion 11 and the voltage step-down circuit 41, are integrated inside the power supply device 10. The detection circuit 43 is used for detecting the status of the electronic product 30 and automatically regulates the output voltage of the voltage step-down circuit 41 to supply power required for charging or operating the electronic product. Moreover, when the electronic product 30 is completely charged, the voltage step-down circuit 41 can be turned off to stop supplying power to the electronic product 30.

Figure 7:
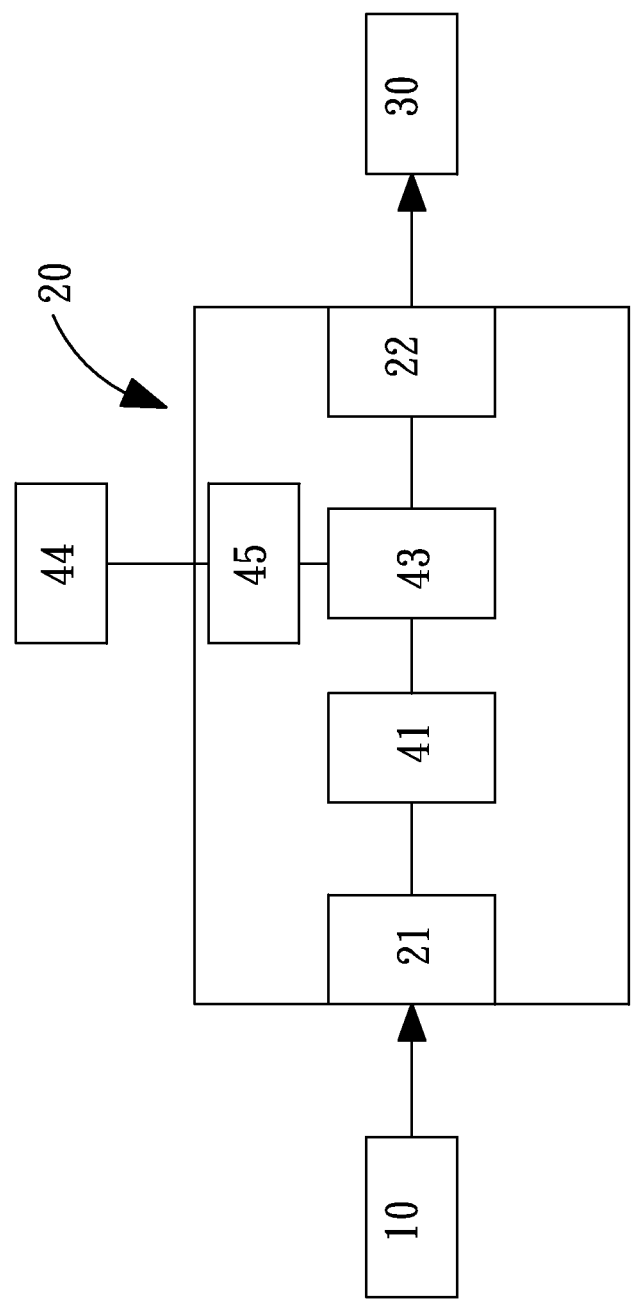
FIG. 7 is a block diagram of an assembled architecture of a charging module according to a fifth embodiment of the present invention.
Figure 8:
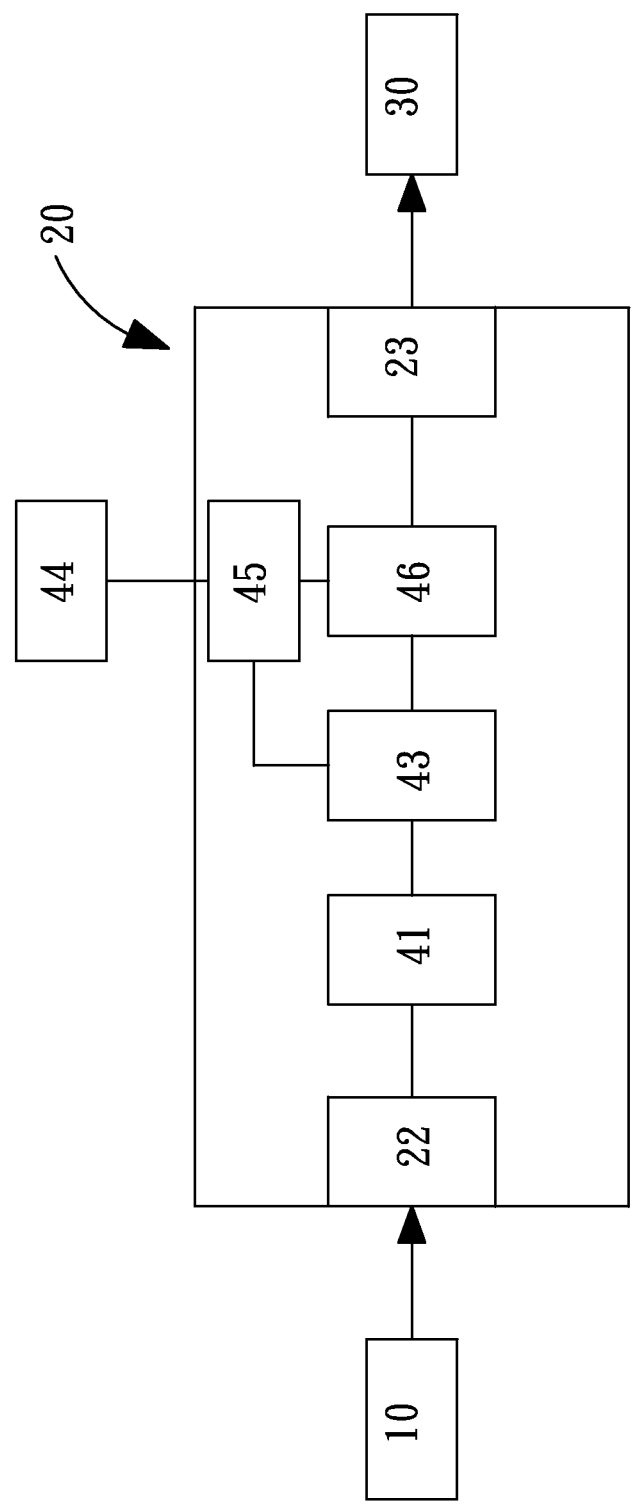
FIG. 8 is a block diagram of an assembled architecture of a charging module according to a sixth embodiment of the present invention.

The voltage step-down circuit 41 and the detection circuit 43 can also be disposed inside the adapter 10 as shown in FIG. 7. The detection circuit 43 can further detect current transmission status of the second coupling portion 21 and the third coupling portion 22. A display module 44 is disposed on the main body of the adapter 10 to display the operation status of the power adapter. A microcontroller 45 is disposed inside the main body, and the microcontroller 45 is electrically connected to the detection circuit 43 and the display module 33 and presets a plurality of control modes corresponding to the display module 44. The microcontroller 45 is used for receiving signals of the detection circuit 43 and controls the operation of the display module 44. A switch circuit 46 is further disposed inside the main body of the adapter 10 as shown in FIG. 8. The switch circuit 46 is electrically connected to the second coupling portion 21, the third coupling portion 22 and the microcontroller 45. The microcontroller 45 controls the motion of the switch circuit 46 based upon the signal transmitted by the detection circuit 43 so as to control whether or not the circuits of the second coupling portion 21 and the third coupling portion 22 are conducted. Accordingly, the third coupling portion 22 is automatically interrupted under a condition of no charging power normally, thereby preventing the service life of the electronic product from being influenced by unusual power supply.

Figure 9:
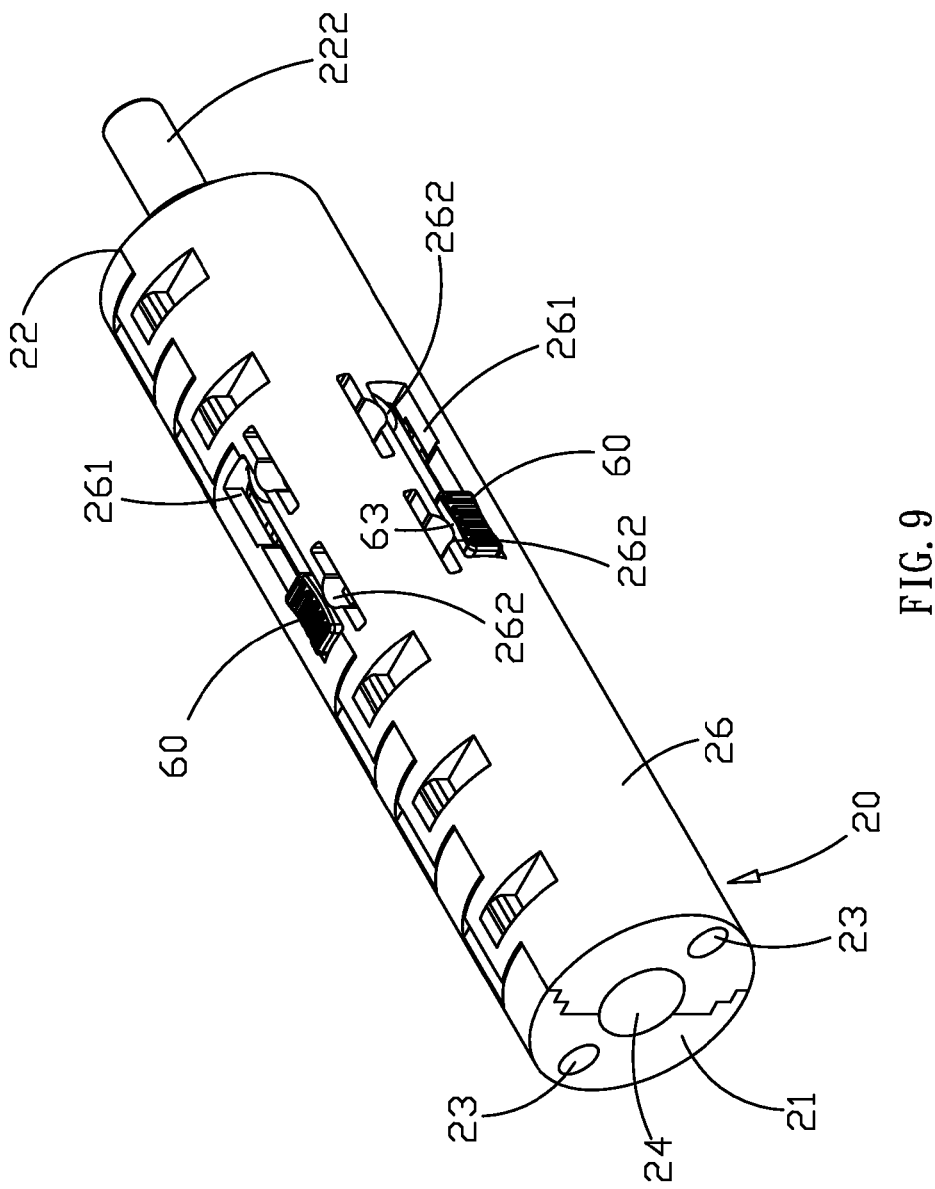
FIG. 9 is a structural diagram of an appearance of an adapter according to a seventh embodiment of the present invention.
Figure 10:
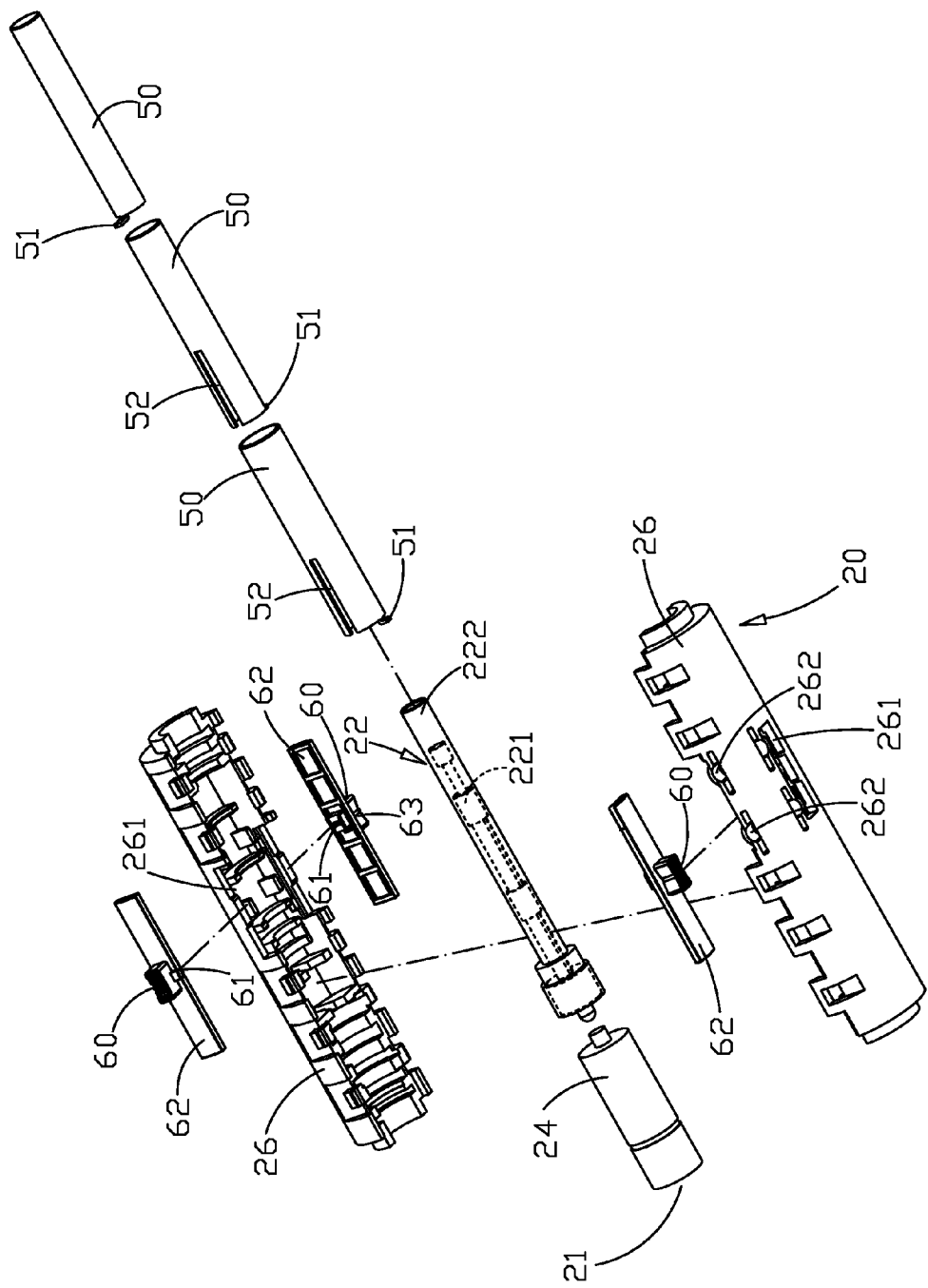
FIG. 10 is a decomposition drawing of a structure of an adapter according to a seventh embodiment of the present invention.

As shown in FIG. 9 and FIG. 10, when the power adapter is implemented, the power adapter 20 comprises a main body 26, a second coupling portion 21, a third coupling portion 22, several movable conduction sleeves 50 and several push buttons 60 corresponding to the movable conduction sleeves 50.

Several slot holes 261 are axially arranged on the main body 26. The second coupling portion 21 is arranged on the main body 26 and has electrode contacts 24 with predetermined numbers/formats and a second magnetic attraction component 23.

The third coupling portion 22 is disposed to the main body 26 to electrically connect the second coupling portion 21. The third coupling portion 22 has an electrode spindle 221 and an electrode bushing 222 stretching out the main body.

The several movable conduction sleeves 50 are sequentially laminated to an external ring of the electrode bushing 222 and respectively connected to the push button 60 piercing through the main body. Each movable conduction sleeve 50 can be relatively shifted and retain the junction effect. The movable conduction sleeve 50 located to the extreme inner layer nibs against the electrode bushing 222.

Figure 11:
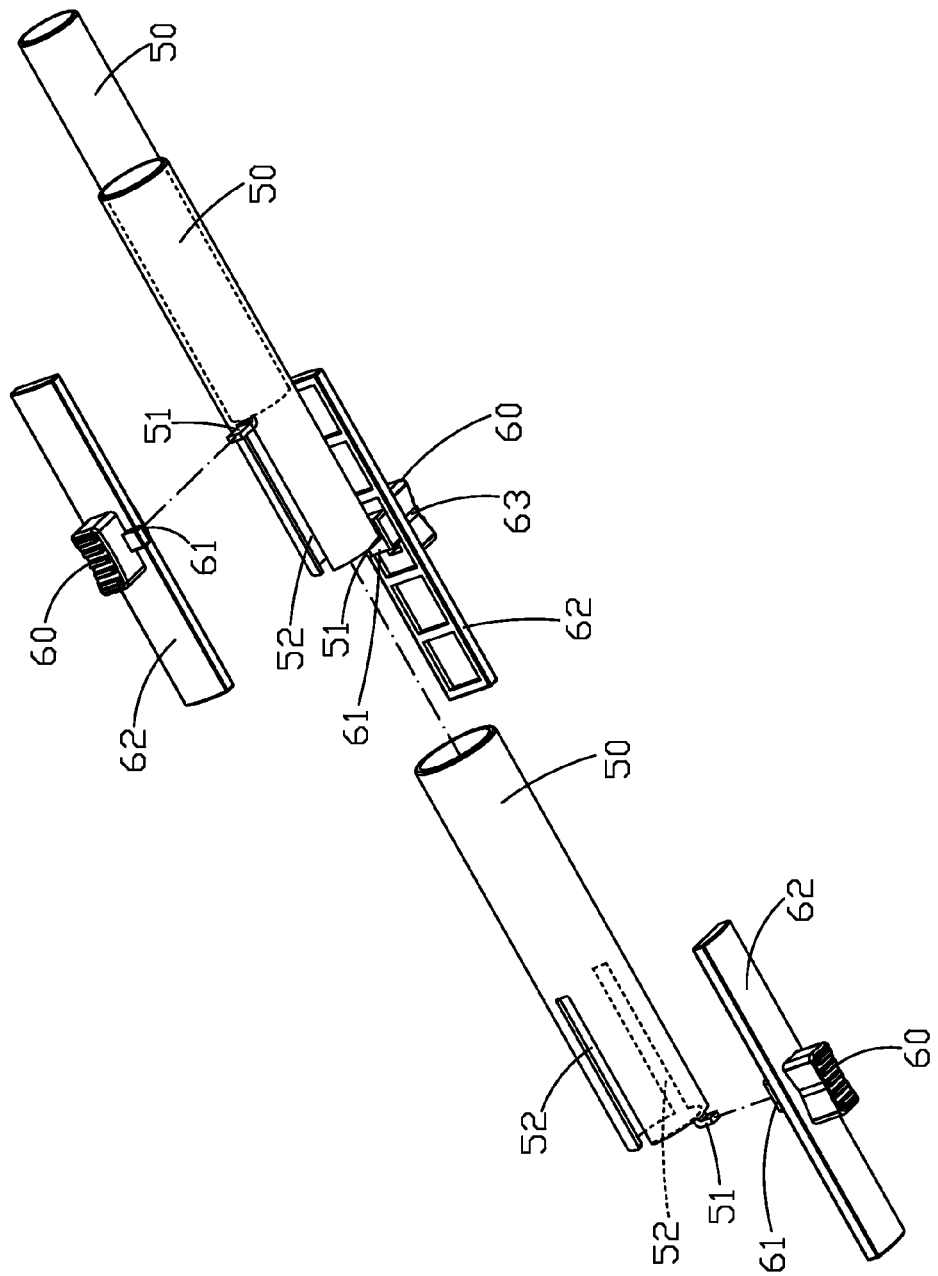
FIG. 11 is a decomposition drawing of structures of a push button and a movable conduction sleeve according to the present invention.
Figure 12:
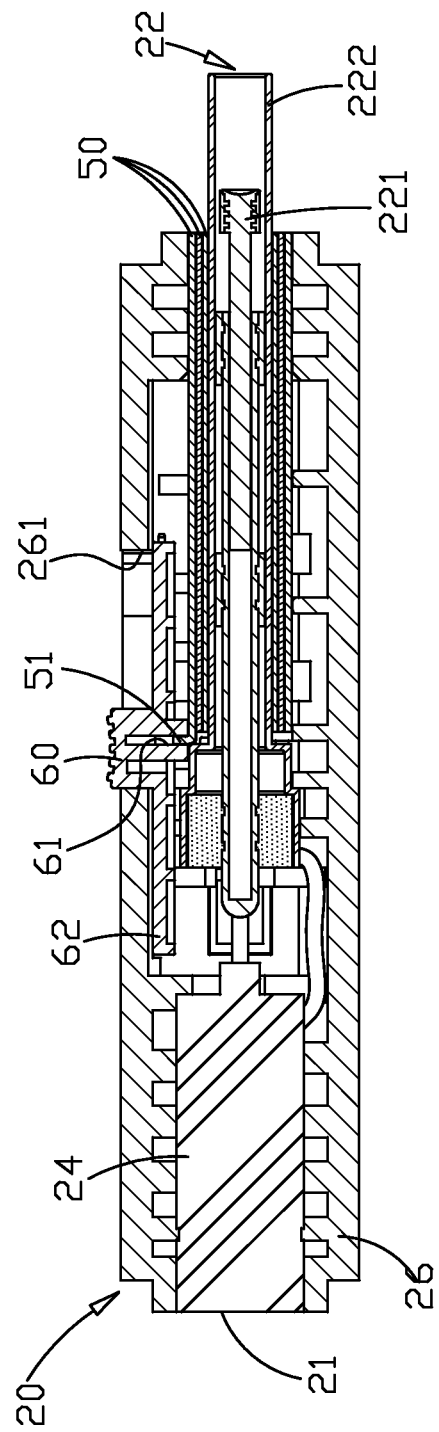
FIG. 12 is a cross-sectional drawing of a structure according to the present invention.
Figure 13:
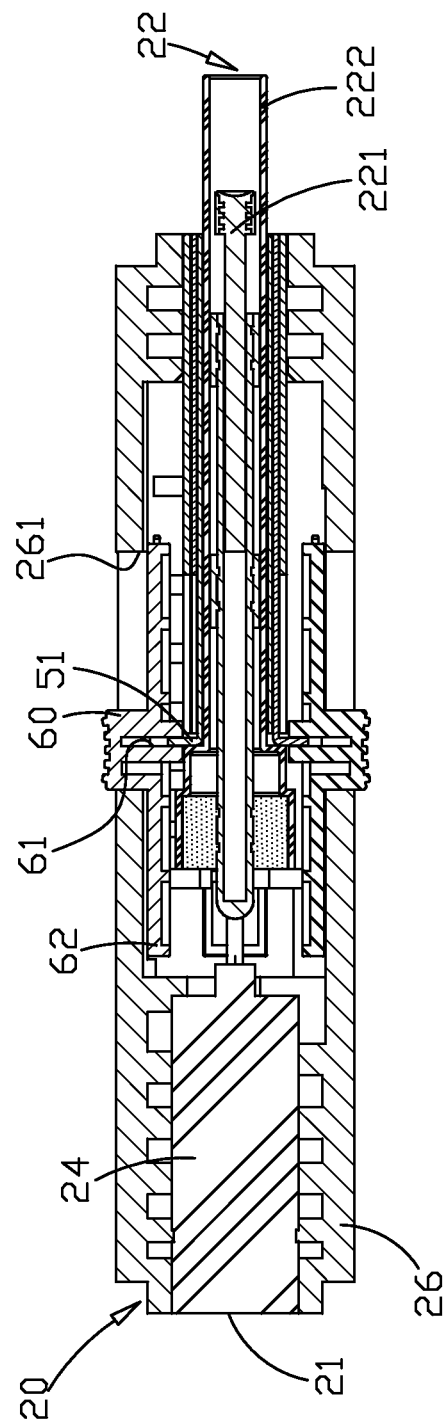
FIG. 13 is a cross-sectional drawing of a structure at another angle according to the present invention.

The several push buttons 60 individually pierce through the slot hole 261 of the main body 26 and are connected to the movable conduction sleeve 50 to form a linking effect together with the movable conduction sleeve 50. While in implementation, as shown in FIG. 11 to FIG. 13, each push button 60 is disposed with a clamping port 61 at a side of the main body 26. A tail of each movable conduction sleeve 50 is bent with a protrusion plate 51 for inserting the clamping port 61 of the push button 60 to form the linking effect between the push button 60 and the movable conduction sleeve 50. More specifically, a tail of the movable conduction sleeve 50, which is relatively disposed to the outer layer, is equipped with a trough 52 that is passed by the protrusion plate 51 of the movable conduction sleeve 50 relatively disposed to the inner layer, thereby relatively reducing the length of the adapter 20.

Figure 14:
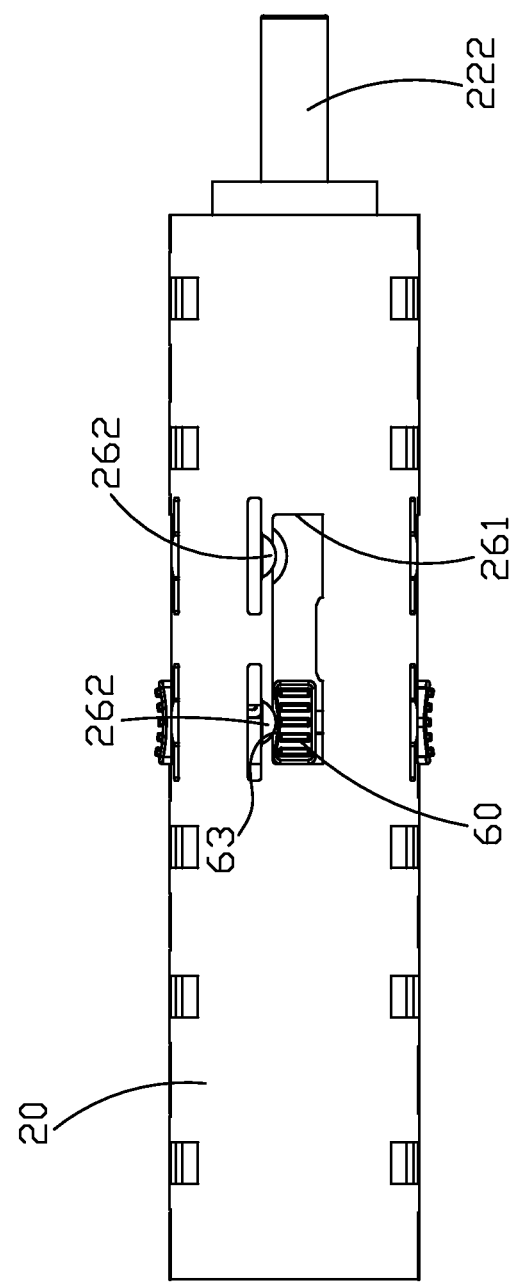
FIG. 14 is a schematic diagram of positioning status of a push button according to the present invention.

Each push button 60 is disposed with an extending plate 62 for covering the slot hole 261 of the main body 26 and a positioning cavity 63 at its wall surface. The main body 26 has flexible protruding buckles 262 at two ends of the sliding stroke performed by the push button 60 in each slot hole 261 to cross the positioning cavity 63 of the push button 60 as shown in FIG. 14, thereby achieving goals of positioning the push button 60 and the movable conduction sleeve 50.

With reference to FIG. 10 and FIG. 13, when the adapter unit 20 of the invention is used, it does not only electrically connect a user object from the third coupling portion, but also allows the user to selectively push one or multiple movable conduction sleeves 50 toward a front of the main body 26 through the push button 60 relatively appearing the main body 26. The movable conduction sleeves 50 at different positions or having different numbers are utilized to incorporate with the electrode bushing 222 to form a specific externally diameter so as to match the application demand for different objects.

Specifically, the charging module of the invention does not only deliver power of the power supply device to the electronic product through replacement of different adapter so as to charge the electronic product real-time, but also further utilizes magnetic attraction effect to form the junction effect between the adapter and the power supply device. While urgently taking the electronic product, the electronic product can be separated from the power supply unit by slightly imposing forces. The electronic product can be quickly taken by a user without influencing the operation of the electronic product such that the practicality and the convenience of the charging module can be relatively improved.

The preferable charging module improves over the prior art and complies with patent application requirements, and thus is duly filed for patent application. While the invention has been described by device of specific embodiments, numerous modifications and variations could be made thereto by those generally skilled in the art without departing from the scope and spirit of the invention set forth in the claims.

What is claimed is:

1. A charging module comprising:
a power supply device, wherein a main body of the power supply device is disposed with a first coupling portion electrically connected to an adapter, and a first magnetic attraction component is disposed to the first coupling portion;
at least one adapter, wherein a main body of the adapter is provided with a second coupling portion electrically connected to the power supply device and a third coupling portion electrically connected to the electronic product, the third coupling portion having electrode contacts matching a specification of the electronic product; and
the adapter disposed with a second magnetic attraction component, which is attracted to the first magnetic attraction component, at the second coupling portion coupled to the power supply device.

2. The charging system as recited in claim 1, wherein a power conversion module is disposed inside the power supply device, and the power conversion module converts alternating current power into direct current power required for charging or operating the electronic product.

3. The charging system as recited in claim 1, wherein at least one rechargeable battery is disposed inside the power supply device, and the rechargeable battery supplies direct current power required for charging or operating the electronic product.

4. The charging system as recited in claim 1, wherein a power conversion module and at least one rechargeable battery, and the power conversion module converts alternating current power into direct current power as a supplement power for the rechargeable battery, and the rechargeable battery then supplies power required for charging or operating the electronic product.

5. The charging system as recited in claim 1, wherein the first coupling portion of the power supply device has electrode contacts with predetermined numbers/formats, and the second coupling portion of the adapter has electrode contacts with predetermined numbers/formats.

6. The charging system as recited in claim 1, wherein at least one rechargeable battery is disposed inside the power supply device, and the first coupling portion is disposed with a first induction coil electrically connected to the rechargeable battery, and the second coupling portion of the adapter has a second induction coil connected to the third coupling portion, and the first induction coil and the second induction coil generate electromagnetic wave induction so that the rechargeable battery provides power required for charging or operating the electronic product.

7. The charging system as recited in claim 1, wherein the first magnetic attraction component and the second magnetic attraction component are respectively composed of a magnet and an iron member.

8. The charging system as recited in claim 1, wherein the first magnetic attraction component and the second magnetic attraction component are composed of magnets.

9. The charging system as recited in claim 1, wherein a voltage step-down circuit is integrated inside the adapter, and a switch provided for switching output voltages of the voltage step-down circuit is disposed to the adapter.

10. The charging system as recited in claim 1, wherein a voltage step-down circuit and a detection circuit, which is electrically connected to the second coupling portion, the third coupling portion and the voltage step-down circuit, are integrated inside the adapter, and the detection circuit detects status of the electronic product to automatically regulate the output voltage of the voltage step-down circuit.

11. The charging system as recited in claim 10, wherein the detection circuit further detects current transmission status of the second coupling portion and the third coupling portion, and the main body is equipped with a display module for displaying operation status of the power adapter, and a microcontroller is disposed inside the main body, and the microcontroller is electrically connected to the detection circuit and the display module and presets a plurality of control modes corresponding to the display module, and the microcontroller is used for receiving signals of the detection circuit and controls an operation of the display module.

12. The charging system as recited in claim 11, wherein a switch circuit is further disposed in the main body, and the switch circuit is electrically connected to the second coupling portion, the third coupling portion and the microcontroller, and the microcontroller controls a motion of the switch circuit based upon signals of the detection circuit so as to control whether or not circuits of the second coupling portion and the third coupling portion are conducted.

13. The charging system as recited in claim 1, wherein a voltage step-down circuit is integrated into the power supply device, and a switch for switching output voltages of the voltage step-down circuit is disposed to the power supply device.

14. The charging system as recited in claim 1, wherein a voltage step-down circuit and a detection circuit, which is electrically connected to the first coupling portion and the voltage step-down circuit, are integrated inside the power supply device, and the detection circuit detects status of the electronic product to automatically regulate the output voltage of the voltage step-down circuit.

15. The charging system as recited in claim 1, wherein several slot holes are axially arranged to the main body of the adapter, and the electrode contact of the third coupling portion has an electrode spindle and an electrode bushing stretching out the main body normally, and several movable conduction sleeves are sequentially laminated over the electrode bushing to relatively shift between movable conduction sleeves and to retain a junction effect through mutual contacting, and the movable conduction sleeve at an extreme inner layer rubs against the electrode bushing, and several push buttons pierce through the slot hole of the main body, and each push button is connected to the movable conduction sleeve to form a linking effect together with the movable conduction sleeve.

16. The charging system as recited in claim 15, wherein each push button is equipped with a clamping port at a side inside the main body, and a tail of each movable conduction sleeve is bent with a protrusion plate provided for inserting into the clamping port of the push button, and a tail of the movable conduction sleeve, which is relatively disposed to an outer layer, is equipped with a trough that is passed by the protrusion plate of the movable conduction sleeve.

17. The charging system as recited in claim 15, wherein each push button is disposed with a positioning cavity at a wall surface of the push button, and the main body has flexible protruding buckles at two ends of a sliding stroke performed by the push button in each slot hole to cross the positioning cavity of the push button.

* * * * *